US008463082B2

(12) United States Patent
Nakagawa et al.

(10) Patent No.: US 8,463,082 B2
(45) Date of Patent: Jun. 11, 2013

(54) MANUFACTURING METHOD FOR ELECTROOPTIC ELEMENT AND OPTICAL DEFLECTOR INCLUDING ELECTROOPTIC ELEMENT

(75) Inventors: Jun Nakagawa, Yokohama (JP); Koichiro Nakamura, Yokohama (JP); Shuichi Suzuki, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 96 days.

(21) Appl. No.: 13/227,018

(22) Filed: Sep. 7, 2011

(65) Prior Publication Data

US 2012/0063715 A1    Mar. 15, 2012

(30) Foreign Application Priority Data

Sep. 13, 2010    (JP) ................................ 2010-204137

(51) Int. Cl.
*G02F 1/295* (2006.01)
(52) U.S. Cl.
USPC .................................... 385/8; 385/11; 29/846
(58) Field of Classification Search
USPC .......................................... 385/8–11; 29/846
See application file for complete search history.

(56) References Cited

U.S. PATENT DOCUMENTS

| 5,274,727 | A | 12/1993 | Ito et al. |
| 5,734,772 | A | 3/1998 | Gopalan et al. |
| 5,786,926 | A | 7/1998 | Yamada |
| 5,920,662 | A | 7/1999 | Hinkov |
| 6,437,486 | B1* | 8/2002 | Burcsu et al. ................. 310/358 |
| 6,565,648 | B1 | 5/2003 | Nakamura et al. |
| 7,529,455 | B2 | 5/2009 | Suzuki et al. |
| 8,064,129 | B2* | 11/2011 | Gawith et al. ................. 359/328 |
| 2004/0126079 | A1 | 7/2004 | Aoki et al. |
| 2005/0207721 | A1 | 9/2005 | Aoki et al. |
| 2011/0064352 | A1 | 3/2011 | Nakagawa et al. |
| 2011/0128538 | A1* | 6/2011 | Cerullo et al. ................. 356/301 |

FOREIGN PATENT DOCUMENTS

| JP | 62-47627 | 3/1987 |
| JP | 4-335329 | 11/1992 |
| JP | 5-2201 | 1/1993 |
| JP | 6-281983 | 10/1994 |
| JP | 9-501245 | 2/1997 |
| JP | 9-146128 | 6/1997 |
| JP | 10-288798 | 10/1998 |
| JP | 3050333 | 3/2000 |
| JP | 2007-212787 | 8/2007 |
| WO | WO 2009/101390 A1 | 8/2009 |

OTHER PUBLICATIONS

"Basics and Application of Polarization Inverted Device", The Optronics Co., Ltd., pp. 90-101.

(Continued)

*Primary Examiner* — Ellen Kim
(74) *Attorney, Agent, or Firm* — Oblon, Spivak, McClelland, Maier & Neustadt, L.L.P.

(57) ABSTRACT

An electrooptic element includes an optical waveguide layer made from a ferroelectric material and having a polarization inverted region of a predetermined shape having an optical incidence face and an optical exit face, and an upper electrode layer and a lower electrode layer formed on a top face and a bottom face of the optical waveguide layer, respectively, in which the ferroelectric material is magnesium-oxide-doped lithium niobate, and at least one of the optical incidence face and the optical exit face of the optical waveguide layer is formed in parallel with a crystal face of the ferroelectric material.

11 Claims, 7 Drawing Sheets

OTHER PUBLICATIONS

Office Action issued Aug. 2, 2012 in European Application No. 11 180 191.6.

K. Mizuuchi, et al., "Electric-field poling in Mg-doped LiNbO$_3$", Journal of Applied Physics, vol. 96, No. 11, XP012068344, Dec. 1, 2004, pp. 6585-6590.

"Basics and Application of Polarization Inverted Device", The Optronics Co., Ltd., pp. 90-101 (submitting English translation only, reference previously filed).

Extended European Search Report issued Dec. 27, 2011, in European Patent Application No. 11180191.6.

D. A. Bryan, et al., "Increased optical damage resistance in lithium niobate", Applied Physics Letters, vol. 44, No. 9, XP-55014932, May 1, 1984, pp. 847-849.

Ian E. Barry, et al., "Microstructuring of lithium niobate using differential etch-rate between inverted and non-inverted ferroelectric domains", Materials Letters, vol. 37, No. 4-5, XP-004256024, Nov. 1, 1998, pp. 246-254.

David A. Scrymgeour, et al., "Large-angle electro-optic laser scanner on LiTaO$_3$ fabricated by in situ monitoring of ferroeletric-domain micropatterning", Applied Optics, vol. 40, No. 34, Dec. 1, 2001, pp. 6236-6241.

Yi Chiu, et al., "Shape-Optimized Electrooptic Beam Scanners: Analysis, Design, and Simulation", Journal of Lightwave Technology, vol. 17, No. 1, Jan. 1, 1999, pp. 108-114.

European Patent Office Communication issued Feb. 4, 2013 in European Application No. 11180191.6-2205/2428837.

David Scrymgeour et al: "Phenomenological theory of a single domain wall in uniaxial trigonal ferroelectrics: Lithium niobate and lithium tantalate"; Physical Review B, vol. 71, No. 18, May 1, 2005, XP055050809, ISSN: 1098-0121, DOI: 10.1103/PhysRevB.71. 184110.

R.S. Weis et al: "Lithium niobate: Summary of physical properties and crystal structure", Applied Physics A Solids and Surfaces, vol. 37, No. 4, Aug. 1, 1985. pp. 191-203, XP055050814, ISSN: 0721-7250, DOI: 10.1007/BF00614817.

"Basics and Application of Polarization Inverted Device", The Optronics Co., Ltd., vol. 3, No. 1, Jun. 8, 2005, pp. 90-101 (with partial English translation); ISBN4-902312-11-5.

* cited by examiner

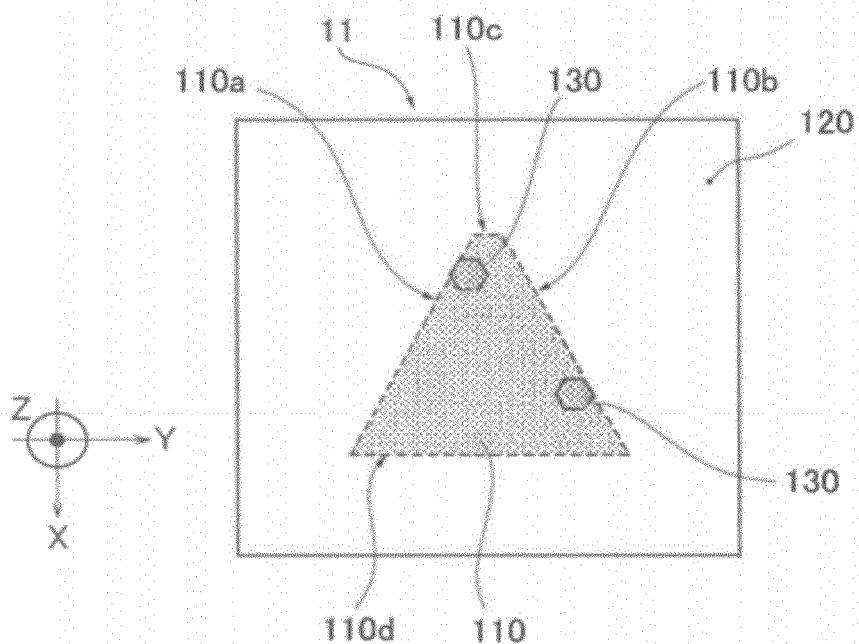
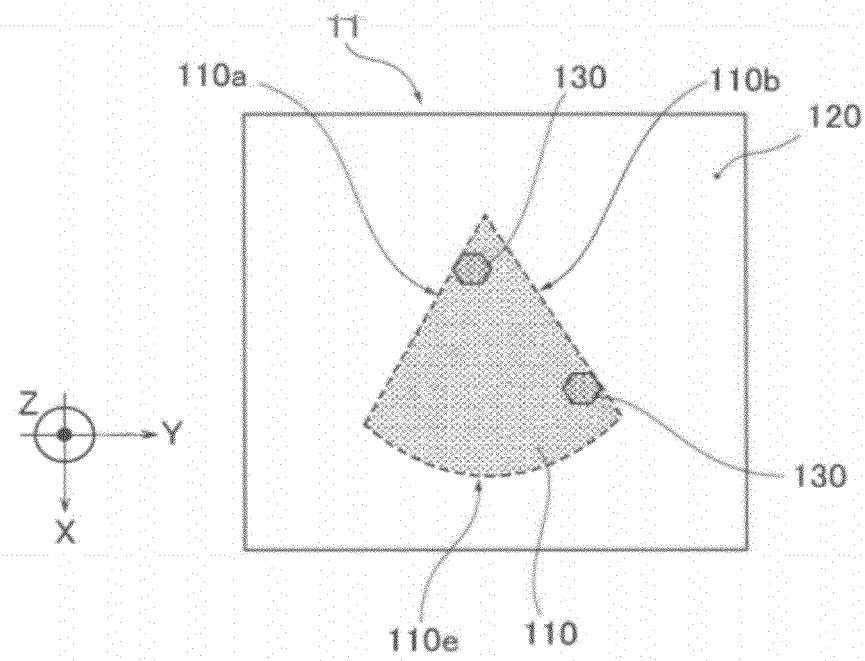

MANUFACTURING METHOD FOR ELECTROOPTIC ELEMENT AND OPTICAL DEFLECTOR INCLUDING ELECTROOPTIC ELEMENT

CROSS REFERENCE TO RELATED APPLICATION

The present application is based on and claims priority from Japanese Patent Application No. 2010-204137, filed on Sep. 13, 2010, the disclosure of which is hereby incorporated by reference in its entirety.

BACKGROUND OF THE INVENTION

1. Field of the Invention

The present invention relates to a manufacturing method for an electrooptic element using a ferroelectric material and an optical deflector including such an electrooptic element.

2. Description of the Prior Art

There are mainly two kinds of optical deflector: a mechanical deflector such as a galvanometer, a polygon mirror, or a micro electro mechanical system (MEMS) and a non-mechanical deflector such as an acoustic optical element or an electrooptic element. Among them, the electrooptic element is configured to control the traveling direction of light by electro-optic effect which is a change in the refractive index of a material in response to the application of an electric field. The change in the refractive index by the Pockels effect is expressed by the following formula:

$$\Delta n \propto rij \times V/d$$

where rij is an electro-optic constant (Pockels constant), V is an applied voltage, and d is an interval between electrodes applying a voltage.

The electrooptic element as an optical deflector is comprised of a ferroelectric made from a single crystal oxide material such as niobate lithium, lithium tantalite, titanate phosphate potassium, niobate potassium which are relatively cheap and stable at ambient temperature, and has a high phase transition temperature. Japanese Patent Application Publication No. S62-047627 discloses an optical deflector including a prism-shape electrode to apply a voltage to an electrooptic element so that it acquires an optical deflecting function. The principle of optical deflection is such that by an applied voltage, a difference in the reflective index of prism regions of the electrooptic element occurs by the Pockels effect, causing deflection of light propagating through the electrooptic element.

The electrooptic element has a disadvantage of a small deflection angle compared with the other kinds of optical deflectors. In view of increasing the deflection angle, a prism domain inversion optical element is proposed in a document by David A. Scrymgeour et al., Applied Optics, Vol. 40, No. 34 (December 2001), Japanese Examined Patent Application Publication No. H09-501245, and Japanese Patent Application Publication No. H09-146128, for example. This optical element is comprised of an electrooptic element in which prism-shape polarization inverted regions are formed in advance, to increase a difference in the refractive index in each prism region by applying a voltage and increase the deflection angle.

The direct electric field impression method is a known method for forming prism-shape polarization inverted regions in the electrooptic element. It is widely used in manufacturing a cyclic polarization inverted structure to generate a second harmonic from a nonliner optical crystal. The polarization inverted region is formed by applying a voltage with or over a coercive electric field between the top and bottom faces of an electro-optic substrate with electrodes formed in a desirable shape on the top and bottom faces. The mechanism of this polarization inversion is disclosed in detail in a publication, "Basics and Application of Polarization Inverted Device", The Optronics Co., Ltd, for example.

Despite of its inexpensive price, high phase transition temperature, and stability at ambient temperature, niobate lithium used in the electrooptic element has a problem in optical damage resistance in a visual light range so that when light in a visual light range is guided thereto, the phase of the guided light is varied, causing the beam profile of emitted light to be distorted. In view of solving this problem, a magnesium-oxide-doped lithium niobate with high optical damage resistance in the visual light range has been developed.

The invertors of the present invention actually formed the prism-shape polarization inverted regions using the magnesium-oxide-doped lithium niobate as an electrooptic material and found out that it is difficult to accurately form the boundaries of polarization inverted regions. Specifically, while the prism-shape polarization inverted regions formed from the niobate lithium have linear interfaces and sharp apex angles, those formed from the magnesium-oxide-doped lithium niobate have curved optical incidence and exit faces 901, 902 on the interfaces and rounded apex angles 903 as shown in FIG. 13A. FIG. 13B shows a distorted profile of emitted light deflected through the polarization inverted regions in FIG. 13A. The distorted profile of emitted light leads to degradation of the performance of the optical deflector such as deterioration in the shape of emitted light or reduction in resolution.

SUMMARY OF THE INVENTION

The present invention aims to provide a manufacturing method for an electrooptic element having a good optical damage resistance in a visual light range and being able to deflect and emit light beam with no distortion of a profile, as well as to provide an optical deflector including such an electrooptic element.

According to one aspect of the present invention, an electrooptic element comprises an optical waveguide layer made from a ferroelectric material and having a polarization inverted region of a predetermined shape having an optical incidence face and an optical exit face, and an upper electrode layer and a lower electrode layer formed on a top face and a bottom face of the optical waveguide layer, respectively, wherein the ferroelectric material is magnesium-oxide-doped lithium niobate, and at least one of the optical incidence face and the optical exit face of the optical waveguide layer is formed in parallel with a crystal face of the ferroelectric material.

BRIEF DESCRIPTION OF THE DRAWINGS

Features, embodiments, and advantages of the present invention will become apparent from the following detailed description with reference to the accompanying drawings:

FIG. 4 is a plan view of another example of the polarization inverted region in the optical waveguide layer;

FIG. 5 is a plan view of still another example of the polarization inverted region in the optical waveguide layer;

DETAILED DESCRIPTION OF THE PREFERRED EMBODIMENT

First Embodiment

Figure 1:
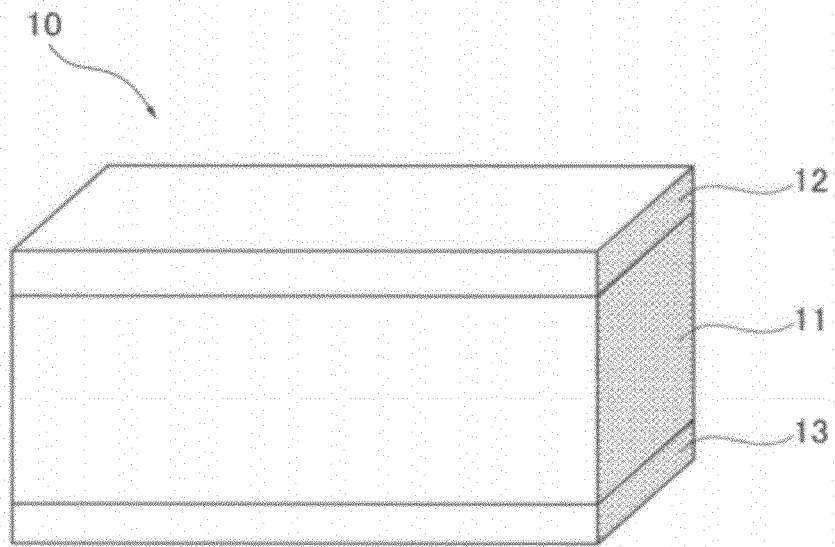
FIG. 1 is a perspective view of an electrooptic element according to one embodiment of the present invention.

Hereinafter, embodiments of the present invention will be described in detail with reference to the accompanying drawings. Wherever possible, the same reference numbers will be used throughout the drawings to refer to the same or like parts. FIG. 1 is a perspective view of an electrooptic element according to a first embodiment of the present invention. An electrooptic element 10 comprises an optical waveguide layer 11 made from a ferroelectric as an electric-optical material and an upper electrode layer 12 and a lower electrode layer 13 formed on the top and bottom faces of the optical waveguide layer 11, respectively. A polarization inverted region is formed in the optical waveguide layer 11.

The electric-optical material of the optical waveguide layer 11 can be a ferroelectric such as niobate lithium (liNbo$_3$), lithium tantalite (LiTao$_3$), KTP, SBN, KTN, or the like. These materials have spontaneous polarization, no applied with an external electric field. Among these, the optical waveguide layer 11 of the electrooptic element 10 is made from a magnesium-oxide-doped niobate lithium (Mgo:LinbO$_3$) having high optical damage resistance. The magnesium-oxide-doped niobate lithium is a single crystal of niobate lithium produced by a crystal growth method such as Czochralski method, Bridgman method, floating zone method in which a magnesium oxide is added in a niobate lithium solution at a predetermined concentration. The magnesium-oxide level thereof is preferably in the range of 4.5 mol % to 5.5 mol % and most preferably, 5.0 mol %. A substrate of the magnesium-oxide-doped niobate lithium is obtainable by cutting a predetermined crystal face of the thus-grown single crystal ingot in a plate form.

In general a region of the ferroelectric in which polarization occurs in the same direction is referred to as a domain. A crystal structure in which polarization occurs in the same direction in the entire ferroelectric crystal is referred to as a single domain structure while that having a plurality of domains in a single ferroelectric crystal in which polarization occurs in different directions from each other is referred to as a multiple domain structure. For example, before formation of the polarization inverted region, the substrate of a ferroelectric crystal used for the optical waveguide layer 11 of the electrooptic element 10 is of a single domain structure. However, after formation of the polarization inverted region, polarization occurs in different directions in the polarization inverted region and the area around the region in the substrate; thus, the crystal substrate includes two different domains and becomes a multiple domain structure. The boundary between the two domains is generally called as domain wall.

Figure 2:
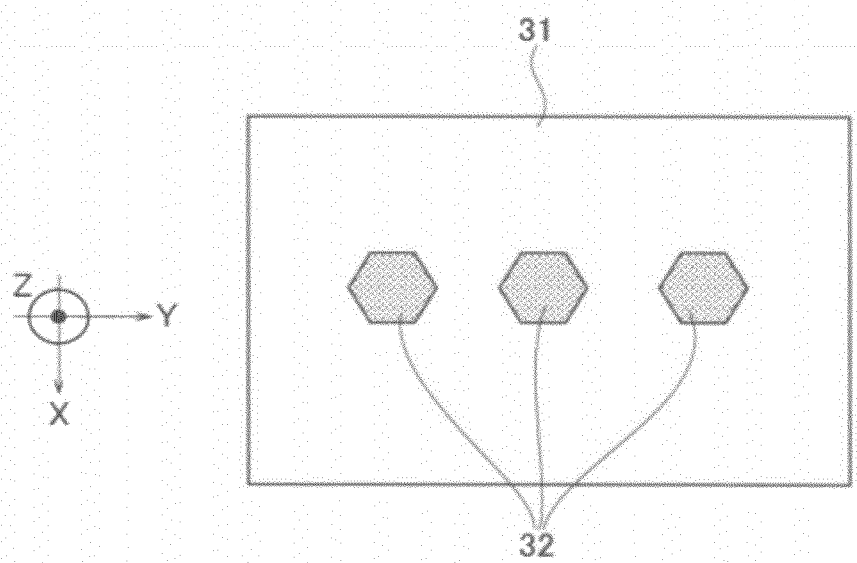
FIG. 2 shows how a polarization inversion occurs on a magnesium-oxide-doped lithium niobate crystal.

FIG. 2 shows the polarization inversion of a magnesium-oxide-doped lithium niobate crystal 31. A direction orthogonal to the drawing is Z axis of the crystal. By applying a predetermined electric field to a part of a ferroelectric of a single domain structure, polarization inverted domains in a finite size or reversal nuclei occur first. The reversal nuclei are surrounded by crystal faces. Then, the domains vertically expand to the domain walls as the boundary so that the entire region applied with the electric field becomes a polarization inverted region as a single domain. The crystal 31 in FIG. 2 has a three-fold symmetry crystal structure and three equivalent X axes at rotary positions inclined by 120 degrees around the Z axis in the drawing. There are three each +X faces and −X faces orthogonal to each other on the positive and negative sides of each X axis. Due to the symmetry of the crystal, the outer shape of domains 32 as partially polarized regions of the magnesium-oxide-doped lithium niobate crystal 31 or the outer shape of the domain walls is a regular hexagonal column whose cross section along the Z axis is a regular hexagon of six X faces (three −X faces and three +X faces). Thus, polarization inverted regions with the hexagonal domains 32 as reversal nuclei are formed by direct field impression.

In the first embodiment the optical incidence face and optical exit face of the polarization inverted region in the optical waveguide layer are formed to be parallel to two crystal faces (X faces) of the magnesium-oxide-doped lithium niobate corresponding to the optical incidence and exit faces among the six crystal faces constituting the domain walls of the reversal nuclei.

The inventors of the present invention conducted the following experiment and defined the above relation between the optical incidence and exit faces of the polarization inverted region of the optical waveguide layer 11 and the crystal faces of the magnesium-oxide-doped lithium niobate as the electric-optical material on the basis of the results of the experiment.

Figure 12A:
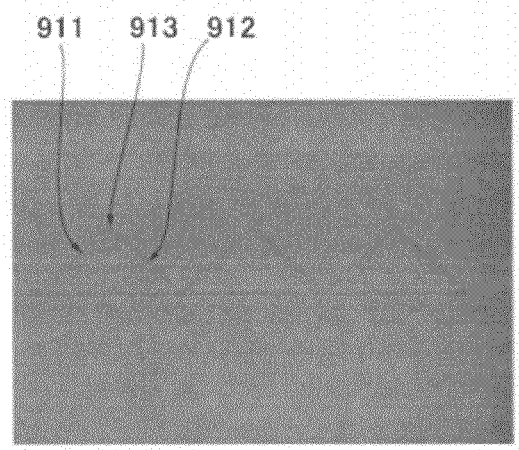
FIG. 12A shows a cross sectional shape of the polarization inverted region of an optical waveguide layer of an electrooptic element made from niobate lithium with no oxide magnesium doped according to another embodiment of the present invention.
Figure 12B:
FIG. 12B shows the profile of emitted light from the electrooptic element in FIG. 12A.

First, for comparison, a prism-shape polarization inverted region with optical incidence and exit faces was formed in an optical waveguide layer made from a niobate lithium with no magnesium oxide doped to produce an electrooptic element. An optical deflector was formed of the electrooptic element. Although not formed to be parallel to the crystal faces (X faces) of the niobate lithium, optical incidence and exit faces 911, 912 of the polarization inverted region in the optical waveguide layer were flat and an apex angle 913 was very sharp, as shown in FIG. 12A. The profile of propagated light beam (emitted light beam) deflected by the optical deflector including the electrooptic element was not distorted and had no change from that of incident light, as shown in FIG. 12B.

Figure 13A:
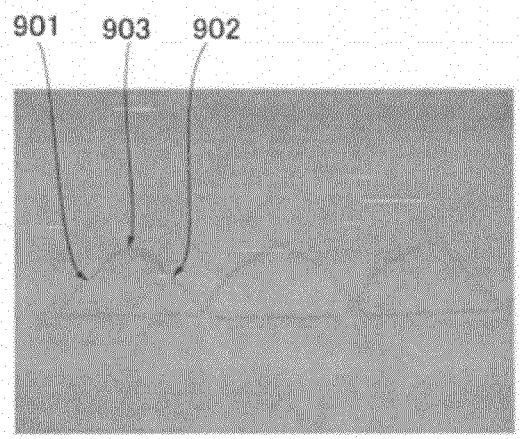
FIG. 13A shows an example of the polarization inverted region of the optical waveguide layer of a prior art electrooptic element.
Figure 13B:
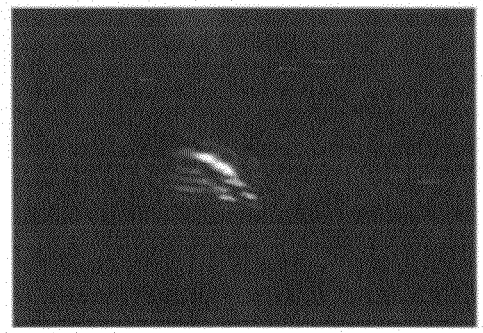
FIG. 13B shows the profile of emitted light from the electrooptic element in FIG. 13A.

Next, a prism-shape polarization inverted region with optical incidence and exit faces was formed in an optical waveguide layer made from a magnesium-oxide-doped lithium niobate to produce an electrooptic element. An optical deflector was formed of the electrooptic element. Similarly to the above, the optical incidence and exit faces of the polarization inverted region were not formed to be parallel to the crystal faces of the magnesium-oxide-doped lithium niobate. In this case, however, optical incidence and exit faces 901, 902 were curved and an apex angle 903 was rounded, as shown in FIG. 13A. The profile of propagated light beam (emitted light beam) deflected by the optical deflector including the electrooptic element was distorted as shown in FIG. 13B.

Through further experiment using the magnesium-oxide-doped lithium niobate, the inventors found that it is able to accurately form the optical incidence and exit faces of the polarization inverted region by arranging them to be parallel to the corresponding ones of the six X faces of the magnesium-oxide-doped lithium niobate, thereby preventing the profile of propagated light beam (emitted light beam) from being distorted.

Figure 3A:
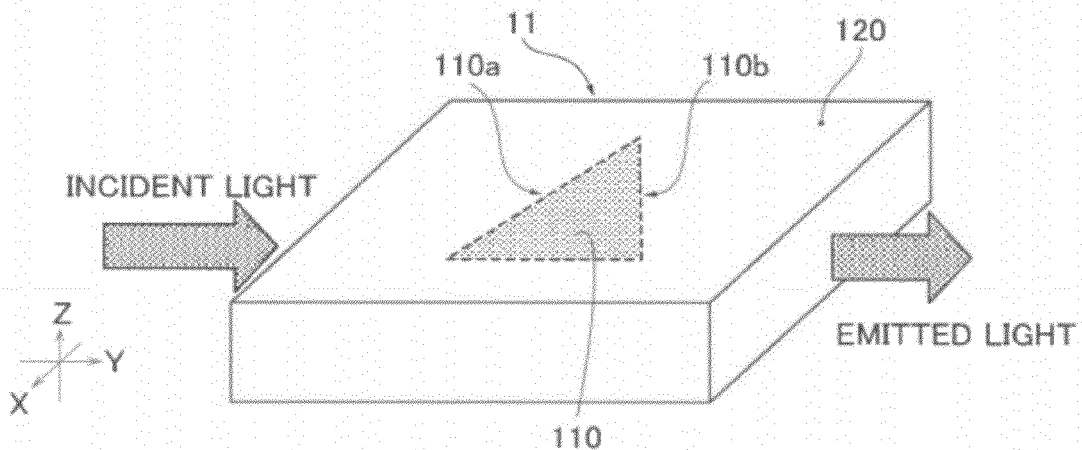
FIGS. 3A, 3B are a perspective view and a plan view of a polarization inverted region in an optical waveguide layer of the electrooptic element, respectively by way of example.
Figure 3B:
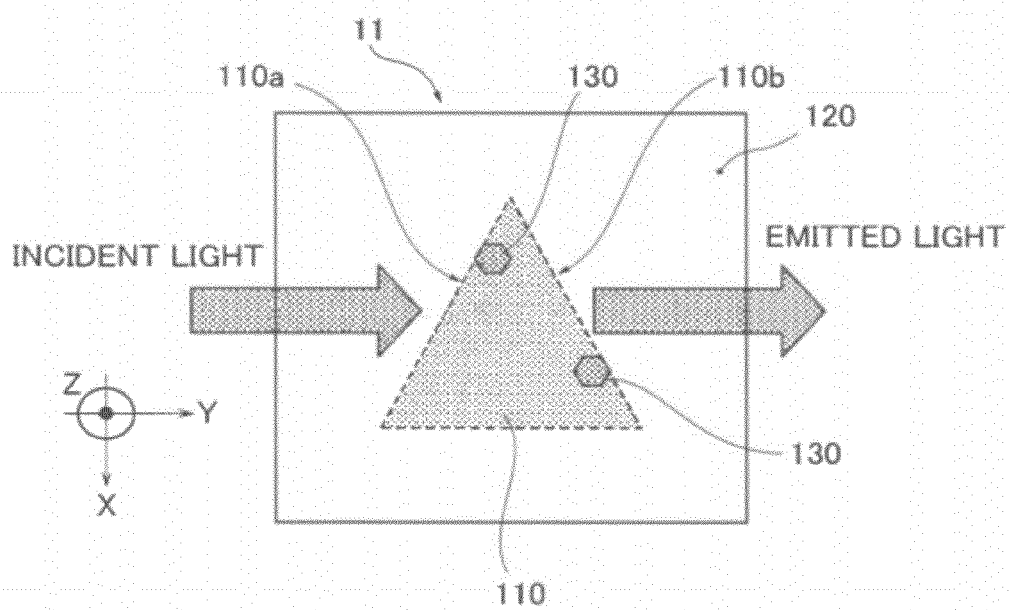

FIGS. 3A, 3B are a perspective view and a plan view of the optical waveguide layer 11 of the electrooptic element 10 according to the first embodiment. A prism-shape polarization inverted region 110 is formed in the plate-like optical waveguide layer 11 of the electrooptic element 10 extending along the thickness thereof from the top face to the bottom face. Optical incidence and exit faces 110a, 110b of the polarization inverted region are formed to be parallel to corresponding ones of 6 crystal faces (X faces) of the magnesium-oxide-doped lithium niobate. FIG. 3B virtually shows regular hexagonal reversal nuclei 130 formed at the initial stage of forming the polarization inverted region 110. The optical incidence and exit faces 110a, 110b of the polarization inverted region 110 are parallel to any two of the 6 crystal faces appearing on the outer side faces of the reversal nuclei 130, respectively.

When a voltage is applied between the top and bottom faces of the optical waveguide layer 11, the refractive index of the polarization inverted region 110 inside the optical waveguide layer 11 is n+Δn and a polarization non-inverted region 120 except for the region 110 is n−Δn where n is a refractive index of the ferroelectric, magnesium-oxide-doped lithium niobate as the electric-optical material and Δn is an amount of change in the refractive index caused by the electro-optic effect. Thus, there occurs a difference of 2Δn in refractive index inside the optical waveguide layer 11. This difference causes light to be refracted at the interfaces of the regions 110, 120 or the optical incidence and exit faces 110a, 110b, and emitted light from the optical waveguide layer 11 to be deflected.

To refract light at the optical incidence and exit faces 110a, 110b as the boundary between the regions 110, 120, the optical incidence and exit faces 110a, 110b should not be disposed to be vertical relative to the traveling direction of light. Accordingly, the polarization inverted region 110 extending along the thickness (Z axis) of the optical waveguide layer 11 is preferably of a prism shape or a fan shape.

The prism-shape polarization inverted region has a cross section of a polygon shape surrounded by at least three straight lines on a virtual face orthogonal to the thickness (Z axis) of the optical waveguide layer 11. For example, the cross sectional shape can be a triangle as shown in FIG. 3B, a trapezoid as shown in FIG. 4 or a hexagon. A fan-shape polarization inverted region has a cross section surrounded by at least two straight lines and an arc, for example, one shown in FIG. 5 or one surrounded by three straight lines and an arc. With the accuracy of the optical incidence and exit faces 110a, 110b and downsizing of the electrooptic element 10 taken into account, the cross sectional shape of the polarization inverted region is most preferably a regular triangle as shown in FIG. 3B.

The polarization inverted region 110 of the optical waveguide layer 11 can be formed by the following process.

(1) An electro-optic substrate (diameter φ3 mm, thickness 300 μm, manufactured by Yamaju Ceramics Co., Ltd) of magnesium-oxide-doped lithium niobate is prepared, and a photo resist film in thickness 2 μm is created on the top face (+Z face) of the substrate by spin coating.

(2) A resist pattern with an opening of the photo resist film is formed on a corresponding portion of the regular triangular polarization inverted region 110, so that two sides thereof associated with the optical incidence and exit faces are parallel to the crystal faces of the magnesium-oxide-doped lithium niobate.

(3) A polarization inverted region is formed in the magnesium-oxide-doped lithium niobate crystal by the direct electric field impression method in the following steps, for example.

a. A crystal is attached to a special jag and the top and bottom faces thereof are immersed in liquid electrode. The periphery of the crystal is immersed in insulating oil so as not to allow the top and bottom faces to be conductive and to prevent a leakage of liquid electrode.

b. The temperature of the crystal is increased to a predetermined temperature, for example, 45 degrees for the purpose of increasing the occurrence of the reversal nuclei.

c. A voltage generator is connected to the liquid electrode on the top face at HOT and that on the bottom face at GND to apply, to the crystal, a voltage corresponding to a coercive electric field of the magnesium-oxide-doped lithium niobate.

d. A current flowing into the crystal is measured during the voltage application. Since it is known that spontaneous polarization of the magnesium-oxide-doped lithium niobate is 0.78 μC/mm$^2$, the flowing charge amount at polarization inversion is determined from this value and a polarization inverted size. The flowing charge amount is calculated in real time by integrating the measured current and when the amount exceeds a desired value, the voltage is turned off.

As above, the regular triangle polarization inverted region 110 is formed in the substrate to be used as the optical waveguide layer 11.

Figure 6:
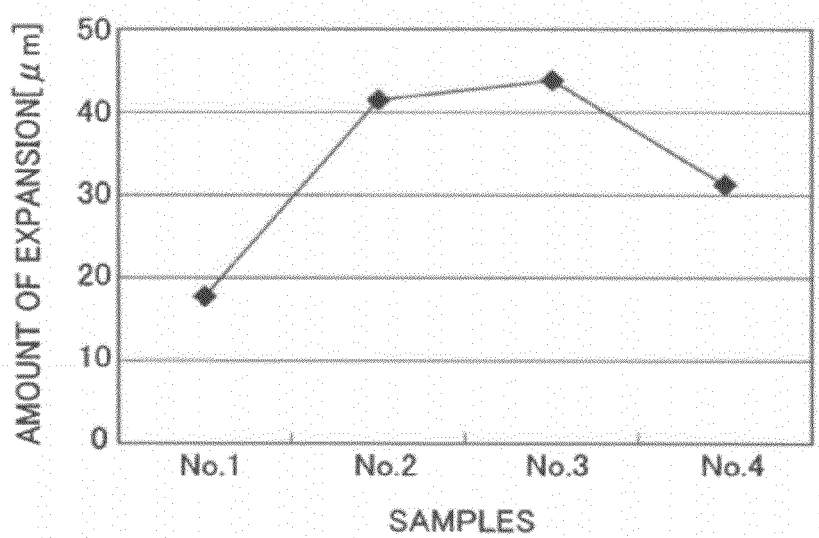
FIG. 6 is a graph showing the result of measuring the amount of expansion of polarization inverted regions formed by the direct electric field impression method.

Expanding outwards from the edge of the opening of the resist pattern, the polarization inverted region 110 formed by the direct electric field impression method becomes larger in size than the opening by a predetermined length. FIG. 6 shows results of measuring an amount of expansion of the polarization inverted region 110 from the edge of the opening of the resist pattern, using four samples of electrooptic substrate. As shown in the drawing, the polarization inverted region 110 expands outwards by about 30 μm on average. It is therefore preferable to measure the amount of expansion of the polarization inverted region 110 formed by the direct electric field impression method in advance and form the opening of the resist pattern to be smaller than a target shape by a predetermined amount which is determined in accordance with the measured amount of expansion. In the example of FIG. 6, the opening is preferably formed to be smaller inwards by 30 μm.

Figure 7A:
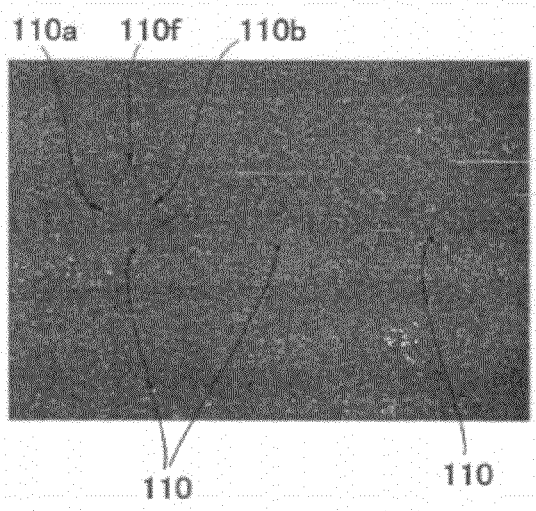
FIG. 7A shows a cross sectional shape of the polarization inverted region of the optical waveguide layer of the electrooptic element according to one embodiment of the present invention.
Figure 7B:
FIG. 7B shows the profile of emitted light from the electrooptic element in FIG. 7A.

Further, in order to accurately form the prism-shape polarization inverted region 110 by the direct electric field impression method, it is preferable to evenly generate reversal nuclei by applying a spiked electric field and then expand the domain walls of the reversal nuclei by applying a constant electric field. Specifically, a spike electric field of 9 kV/mm is applied for a predetermined period, for example 5 sec. and then a constant electric field of 5.5 kV/mm is applied for a predetermined period, for example 5 sec. Thereby, it is able to obtain flat optical incidence and exit faces 110a, 110b at the boundary of the polarization inverted region 110 and polarization non-inverted region 120 as well as a sharp apex angle 110f at which the incidence and exit faces 110a, 110b intersect with each other as shown in FIG. 7A.

After forming the optical waveguide layer 11 including the polarization inverted region 110, the upper electrode layer 12 and the lower electrode layer 13 are formed on the top and bottom faces of the optical waveguide layer 11, respectively (FIG. 2). For materials of the upper and lower electrode layers 12, 13, inexpensive chrome (Cr), titanium (Ti), nickel (Ni), anti-corrosive gold (Au), and platinum (Pt) are usable for example. In the present embodiment titanium films of 200 nm are formed by sputtering as the upper and lower electrode layers 12, 13 of the electrooptic element 10.

Second Embodiment

Figure 8A:
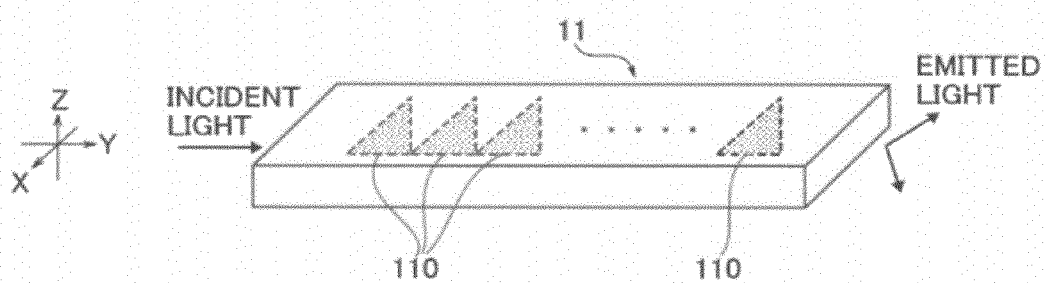
FIGS. 8A, 8B are a perspective view and a plan view of an optical waveguide layer according to another embodiment of the present invention, respectively.
Figure 8B:
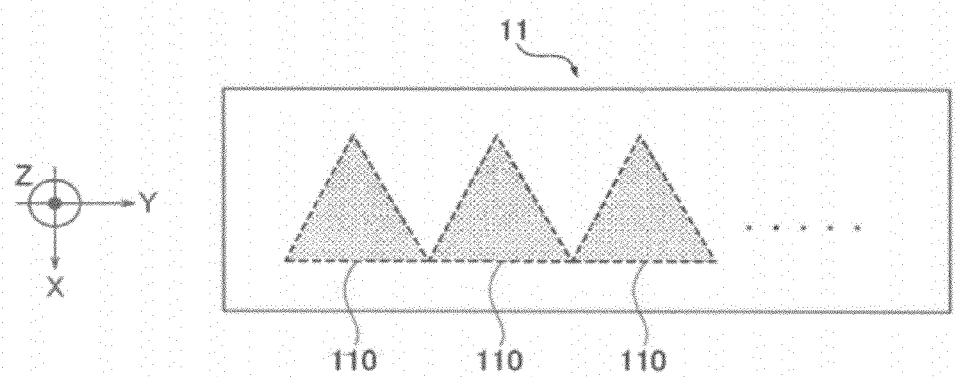

FIGS. 8A, 8B are a perspective view and a plan view of another exemplary structure of the optical waveguide layer 11, respectively. In this example a plurality of polarization inverted regions 10 are arranged in a row to intersect with the thickness of the optical waveguide layer so that a light beam successively passes through the optical incidence and exit faces of the polarization inverted regions. By providing a plurality of polarization inverted regions 110, the deflection angle of emitted light beam can be increased since it is the sum of refraction angles of the respective polarization inverted regions. To increase the deflection angle and at the same time downsize the electrooptic element, it is preferable that the polarization inverted regions should be of a regular triangle shape arranged in a row with no gap.

Figure 9:
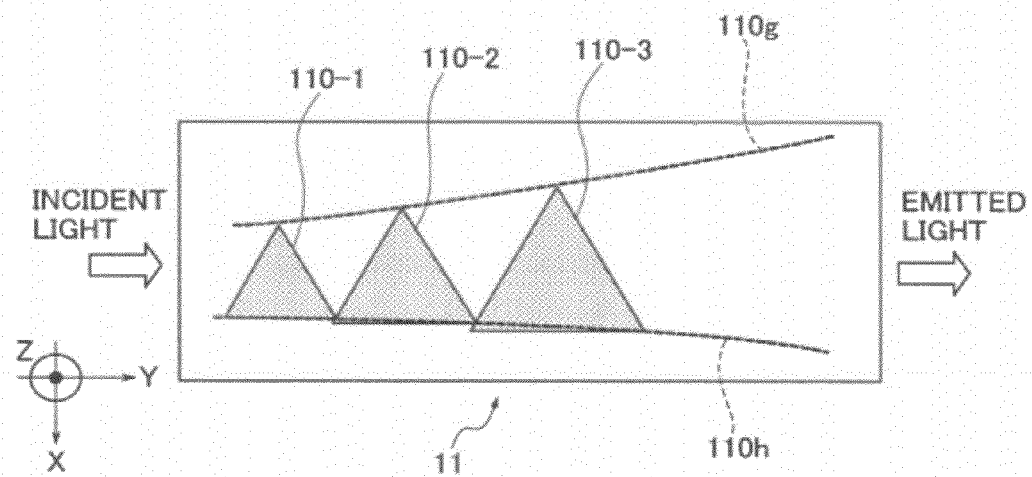
FIG. 9 is a plan view of still another example of the optical waveguide layer.

FIG. 9 is a plan view of another exemplary structure of the optical waveguide layer 11. In this example a plurality of polarization inverted regions 110-1, 11-2 110-3 ... 110-g are arranged in a row to form a horn shape so that they increase in size stepwise from an incidence side. Specifically, the polarization inverted regions 110-1, 110-2 110-3 ... 110-g are formed so that in a beam traveling direction the width of an $n+1^{th}$ (n being a natural number) polarization inverted region 110 is larger than that of an $n^{th}$ polarization inverted region 110. By forming the polarization inverted regions in a horn shape, it is possible to further increase the deflection angle of light beam. According to a document by Yi Chiu et al., Journal of Lightwave Technology, VOL 17, No. 1 (January 1999), prism width D (z) is obtained by the following formula:

$$\frac{dD(z)}{dz} = \left[\frac{4\Delta n_{max}}{n_0}\ln\left(\frac{D(z)}{D_0}\right)\right]^{1/2}$$

where z is traveling distance, D0 is prism width at incidence side, Δnmax is maximum amount of change in refractive index, and n0 is refractive index.

Also, the deflection angle θ(z) is given by the following formula:

$$\theta(z) = 2\Delta n\left[\frac{n_0}{\Delta n_{max}}\ln\left(\frac{D(z)}{D_0}\right)\right]^{1/2}$$

In FIG. 9 the prism width at exit side is calculated to 1.56 mm by the above two formulas where D0 is 0.05 mm, Δnmax is $3.83\times10^{-3}$, refractive index n0 is 2.203, and prism length L is 20 mm. Thus-obtained prism width can be represented by a distance between two envelop curves 110g, 110h in FIG. 9. It is preferable to form the horn-shape polarization inverted regions in such a manner that the size thereof is determined from the two envelop curves 110g, 110h in order from the one at incidence side and they are arranged without a gap.

Third Embodiment

Figure 10:
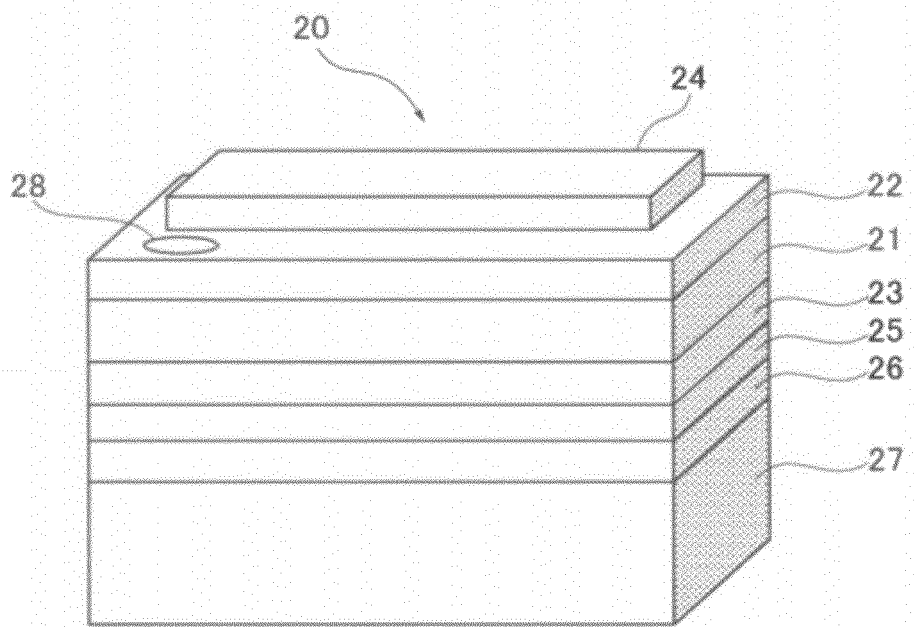
FIG. 10 is a schematic perspective view of the structure of a waveguide electrooptic element by way of example.

FIG. 10 is a schematic perspective view of the structure of a waveguide electrooptic element including the above optical waveguide layer. The waveguide electrooptic element can be driven at a lower voltage than a bulk type element, contributing to reducing the power consumption of an optical deflector including the electrooptic element. In FIG. 10 a waveguide electrooptic element 20 comprises a core layer 21, an upper cladding layer 22, a lower cladding layer 23, an upper electrode 24, a lower electrode 25, an adhesive layer 26, a base plate 27, and an extraction electrode 28. It is produced in the following manner.

To reduce optical loss of guided light, the cladding layers 22, 23 with a refractive index lower than the core layer 21 are formed on the top and bottom faces of the core layer 21, respectively. Dielectrics such as $SiO_2$, $Ta_2O5$, $TIO_2$, $Si_3N_4Al_2O3$, $HfO_2$ are suitable materials for the upper and lower cladding layers 22, 23. Metals such as Au, Pt, Ti, Al, Ni, Cr as well as transparent electrode such as ITO are preferable materials for the upper and lower electrode 24, 25. In the present embodiment the lower cladding layer 23 made from Ta2O5 in thickness of 1 μm is produced by sputtering and then the lower electrode 25 made from Ti in thickness of 200 nm is produced.

The produced lower electrode 25 is adhered to the base plate 27 via an adhesive. The adhesive layer 26 has an even thickness with surface accuracy of 1 μm or less. Then, the core layer 21 is thinned by polishing. The base plate 27 preferably has thermal expansion coefficient equivalent to that of the material of the core layer 21. With a difference in the thermal expansion coefficient between them, the core layer may be distorted and cracked due to internal stress when thermal expansion occurs after the adherence. In the present embodiment, the adhesive layer 26 is made from a UV hardenable resin adhesive, and the base plate 27 is made of a niobate lithium plate in thickness of 300 μm. The core layer 21 in thickness of 10 μm is formed by polishing. The base plate 27 can be made from SUS303 having thermal expansion rate of $1.46\times10^{-5}$/K almost equal to that of the niobate lithium in X-axis direction, $1.54\times10^{-5}$/K. With use of a metal base plate 27, it can be directly joined with the lower electrode 25 instead of using the adhesive.

After polishing the core layer, the upper cladding layer 22 and the upper electrode 24 are produced in the same manner as the lower cladding layer 23 and lower electrode 25. The size of the upper electrode 24 is preferably as small as possible as far as it does not affect the function of the optical deflector. In the optical deflector including the electrooptic element, electrostatic capacitance and operating frequency have a trade-off relation so that the smaller the electrostatic capacitance, the higher the operating frequency and the lower the power consumption at which the optical deflector is driven. Therefore, the upper electrode 24 should be formed only in an area by which refractive index is changed or through which deflected light transmits. In the present embodiment the upper cladding layer 22 is made from Ta2O5 in thickness of 1 µm by sputtering and the upper electrode 24 is made from Ti in thickness of 200 nm by sputtering.

The extraction electrode 28 is formed at the end face of the upper electrode and filled with a conductive material to conduct the upper electrode 24 with the lower electrode 25. This makes it possible to extract the lower electrode 25 without the need to set the size of the base plate 27 to be larger than the core layer 21, resulting in downsizing the waveguide electrooptic element. In the present embodiment a V-shape groove in depth 30 µm is formed with a dicing saw between the upper electrode 24 and the side edge of the upper cladding layer 22, and then filmed with Ti to create the extraction electrode 28. Alternatively, the extraction electrode 28 can be created by dry etching or excimer ablation.

As a result of operation check, it is confirmed that both incident and emitted light on/from the waveguide electrooptic element 20 in FIG. 10 have the same beam profile and beam distortion is prevented.

Third Embodiment

Figure 11:
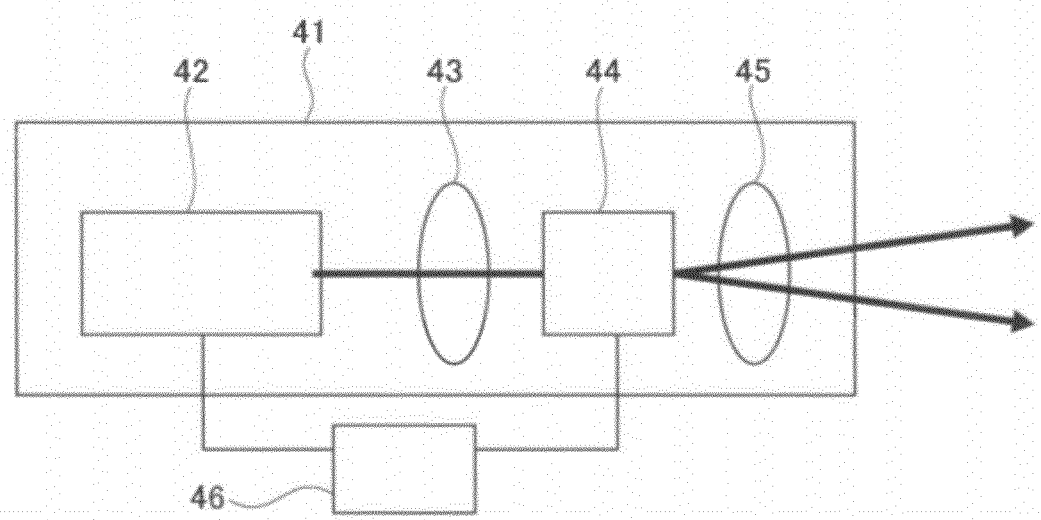
FIG. 11 schematically shows the structure of an example of an optical deflector including the waveguide electrooptic element.

FIG. 11 schematically shows an example of an optical deflector including the above waveguide electrooptic element. An optical deflector 41 comprises a light source 42, an incident optical system 43, an electrooptic element 44, and an exit optical system 45, and a driver 46. The light source 42 is preferably a semiconductor laser with a low cost and a high robustness. The incident optical system 43 is set so that numerical aperture of an incident lens coincides with a waveguide in order to improve optical usage efficiency. The exit optical system 45 includes a collimate lens and a concave-convex lens to increase deflection angle, when needed. The driver 46 comprises a drive circuit to drive the light source 42 and the electrooptic element 44, a buttery, and a signal generator to determine the resolution, drive frequency, and optical exit power of the optical deflector 41.

Thus, according to the above embodiments, due to the use of the magnesium-oxide-doped lithium niobate as the ferroelectric material, the optical damage resistance of the optical waveguide layer 11 in visual light range can be improved. Moreover, by forming the optical incidence and exit faces 110a, 110b of the polarization inverted region 110 of the optical waveguide layer 11 to be parallel to the crystal face of the magnesium-oxide-doped lithium niobate, it is made possible to increase the flatness of the optical incidence and exit faces 110a, 110b and prevent about the edge of an intersecting portion of the two faces 110a, 110b from being rounded, preventing the beam profile of emitted light from being distorted. Accordingly, the electrooptic element can exert high optical damage resistance even in the visual light range and deflect light with less profile distortion.

Moreover, according to the above embodiments the polarization inverted region 110 is configured to extend along the thickness of the optical waveguide layer 11 and have a cross section along the thickness in a polygon shape surrounded by at least three straight lines or in a fan shape surrounded by at least two straight lines and an outward arc. Thereby, the optical incidence and exit faces 110a, 110b extend along the thickness of the polarization inverted region 110 can be formed and they can be inclined so as not to be vertical to a traveling direction of light along the top and bottom faces of the optical waveguide layer 11. Accordingly, light can be reliably refracted by the optical incidence and exit faces 110a, 110b.

Further, according to the above embodiments the plurality of polarization inverted regions 110 are arranged in a row to intersect with the thickness of the polarization inverted regions 110 so that a light beam successively passes through the respective optical incidence and exit faces of the polarization inverted regions. This can increase the deflection angle of emitted light beam.

Further, according to the above embodiments the polarization inverted regions are formed to be a horn shape so that in a beam traveling direction the width of the $n+1^{th}$ (n being a natural number) polarization inverted region 110 is larger than that of the $n^{th}$ polarization inverted region 110. Thereby, the deflection angle of emitted light beam can be further increased.

Furthermore, according to the above embodiments the optical waveguide layer is comprised of the core layer 21 as the optical waveguide layer 11, upper and lower electrode layers 24, 25, and cladding layers 22, 23 formed between the core layer 21 and the upper electrode layer 24 and between the core layer 21 and the lower electrode layer 25, respectively. Thereby, the waveguide electrooptic element can be driven at a lower voltage than a bulk type element, realizing a reduction in the power consumption of the optical deflector including the electrooptic element.

According to the above embodiments, the optical waveguide layer can further include the base plate 27 and the adhesive layer 26 between the lower electrode layer 25 and the base plate 27. This makes it easier to thin the core layer 21 by polishing or the like after joining the lower electrode layer 25 formed on the bottom face of the core layer 21 with the base plate 27 via the adhesive layer 26.

Further, according to the above embodiments the resist pattern having the opening shaped in line with a shape of the polarization inverted region is formed on at least one of the top and bottom faces of the substrate made from the magnesium-oxide-doped lithium niobate. The polarization inverted region is formed in the substrate by applying an electric field to the substrate via the resist pattern. The substrate including the polarization inverted region is used for the optical waveguide layer on which the upper and lower electrodes are formed. Thus, it is made possible to accurately form the polarization inverted region 110 inside the optical waveguide layer by the direct electric field impression method via the resist pattern.

Further, according to the above embodiments, the polarization inverted region 110 can be accurately formed inside the optical waveguide layer 11 by applying an electric field in two steps; first applying a spiked electric field to evenly generate the reversal nuclei and then applying a constant electric field for a predetermined period to expand the domain wall of the reversal nuclei to the size of the polarization inverted region.

Further, according to the above embodiments, the opening of the resist pattern is formed to be smaller in size by a predetermined amount than the target shape of the polarization inverted region 110 along the thickness of the optical waveguide layer. Therefore, the polarization inverted region 110 can be formed in a desired shape by the direct electric field impression method although the polarization inverted region 110 formed by the direct electric field impression method is likely to become larger than the opening of the resist pattern.

The above embodiments have described an example where the optical incidence and exit faces 110a, 110b are formed to be parallel to the crystal faces of the magnesium-oxide-doped lithium niobate. Alternatively, either of the optical incidence and exit faces 110, 110$b$ can be parallel thereto.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An electrooptic element comprising:
   an optical waveguide layer made from a ferroelectric material as a magnesium-oxide-doped lithium niobate and including a polarization inverted region of a predetermined shape having an optical incidence face and an optical exit face so that at least one of the optical incidence face and the optical exit face is formed in parallel with a crystal face of the ferroelectric material; and
   an upper electrode layer and a lower electrode layer formed on a top face and a bottom face of the optical waveguide layer, respectively.

2. An electrooptic element according to claim 1, wherein the polarization inverted region extends along a thickness of the optical waveguide layer and has a cross section in a polygon shape along the thickness of the optical waveguide layer surrounded by at least three straight lines.

3. An electrooptic element according to claim 1, wherein the polarization inverted region extends along a thickness of the optical waveguide layer and has a cross section in a fan shape along the thickness of the optical waveguide layer surrounded by at least two straight lines and an arc.

4. An electrooptic element according to claim 1, wherein:
   the optical waveguide layer includes a plurality of polarization inverted regions arranged in a row to intersect with the thickness of the optical waveguide layer so that a light beam successively passes through the respective optical incidence faces and optical exit faces of the polarization inverted regions.

5. An electrooptic element according to claim 4, wherein in a direction in which the light beam passes, a width of an $n+1^{th}$ polarization inverted region is set to be larger than a width of an $n^{th}$ polarization inverted region, the n being a natural number.

6. An electrooptic element according to claim 1, wherein the optical waveguide layer is made up of a core layer as the optical waveguide layer and cladding layers formed respectively between the core layer and the upper electrode layer and between the core layer and the lower electrode layer.

7. An electrooptic element according to claim 6, further comprising:
   a base plate; and
   an adhesive layer formed between the lower electrode layer and the base plate.

8. A manufacturing method for the electrooptic element according to claim 1, comprising the steps of:
   forming a resist pattern on at least one of a top face and a bottom face of a substrate made from the ferroelectric material, the resist pattern having an opening in a shape in line with a shape of the polarization inverted region;
   forming the polarization inverted region in the substrate to be the optical waveguide layer by a direct electric field impression method in which an electric field is impressed on the substrate via the resist pattern; and
   forming an electrode on each of the top face and bottom face of the optical waveguide layer.

9. A manufacturing method according to claim 8, wherein the polarization inverted region forming step includes a first step of evenly generating a plurality of reversal nuclei by applying a spiked electric field; and a second step of expanding domain walls of the reversal nuclei generated in the first step to the polarization inverted region by applying an electric field with a constant intensity for a predetermined length of time, the reversal nuclei being micro domains in which a spontaneous polarization of the ferroelectric material is inverted.

10. A manufacturing method according to claim 8, wherein the opening of the resist pattern is formed to be smaller by a predetermined amount than a target shape of a cross section of the polarization inverted region along the thickness of the optical waveguide layer.

11. An optical deflector comprising:
    a light source;
    an electrooptic element according to of claim 1, to deflect incident light from the light source;
    an optical system provided on at least one of an optical incidence side and an optical exit side of the electrooptic element; and
    a driver to drive the light source and the electrooptic element.

* * * * *